Oct. 1, 1968 J. A. MACK ET AL 3,404,212
TERMINAL DEVICE FOR WIRE OR CABLE FACILITIES
Filed Jan. 13, 1965 4 Sheets-Sheet 1
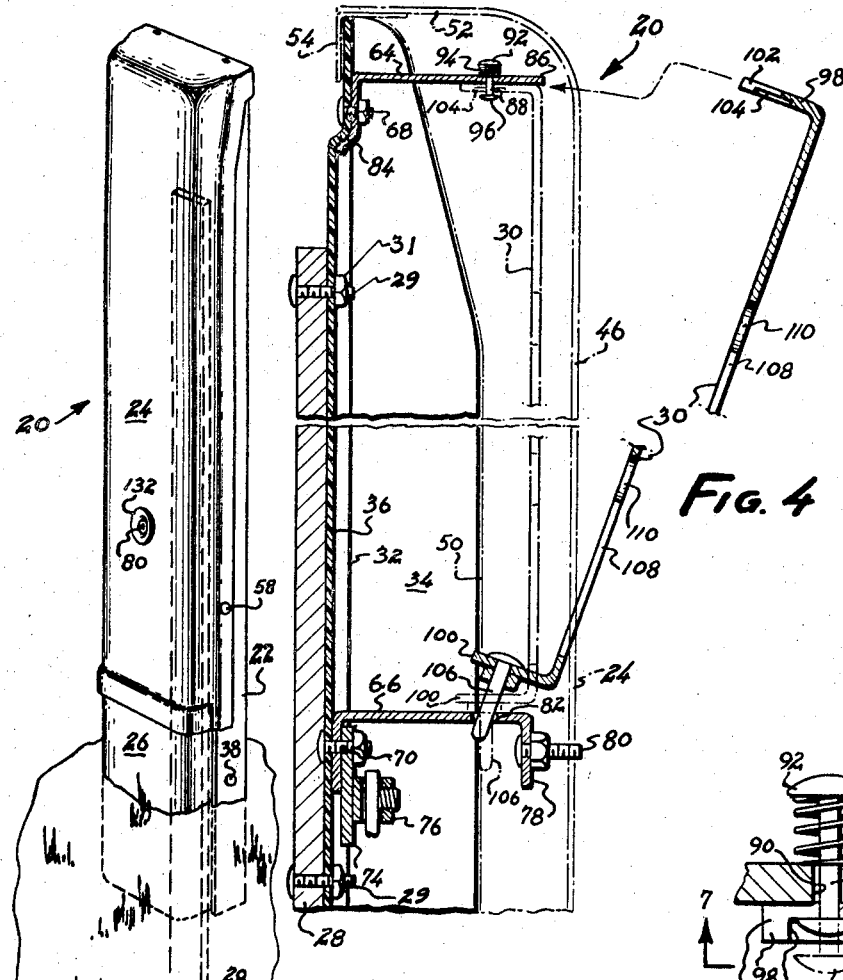
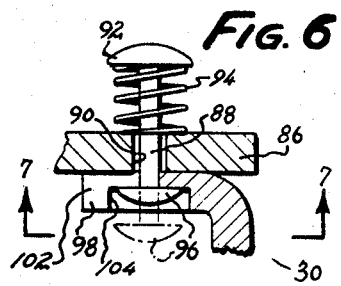
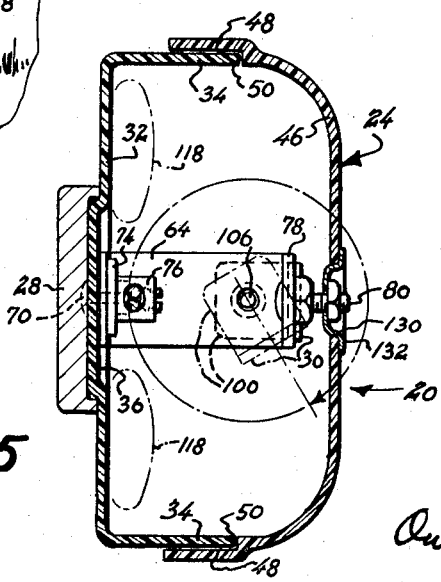
INVENTORS
JULES A. MACK
KAY C. TOMPERS
BY
Owen, Wickersham, & Erickson
ATTYS

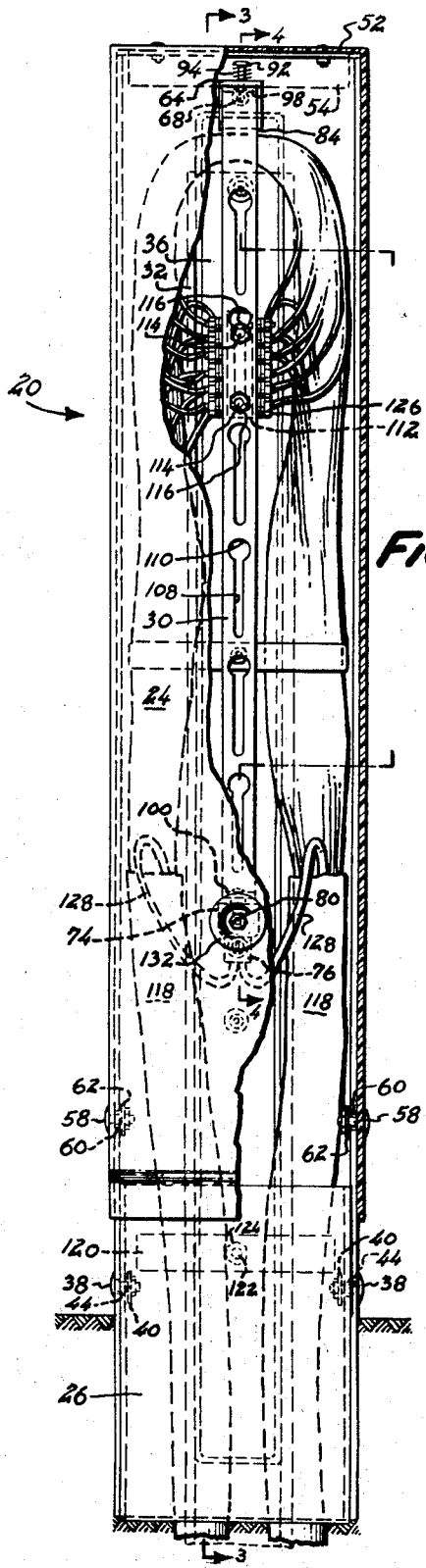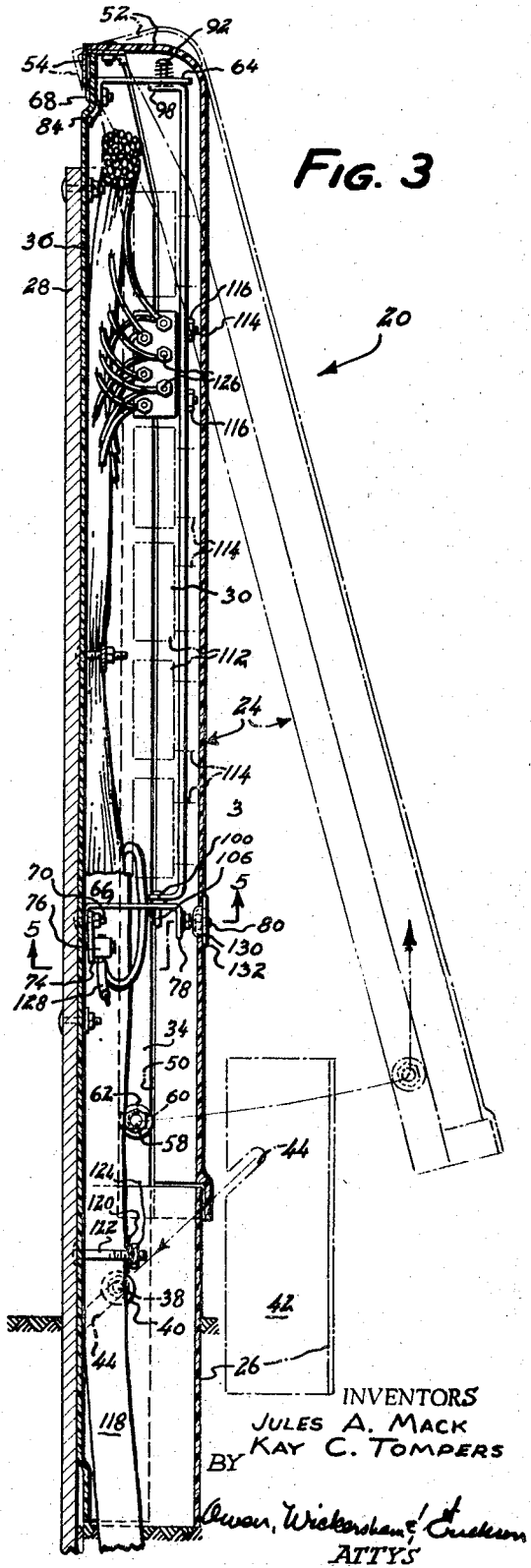
FIG. 2
FIG. 3
INVENTORS
JULES A. MACK
KAY C. TOMPERS
BY
ATTYS

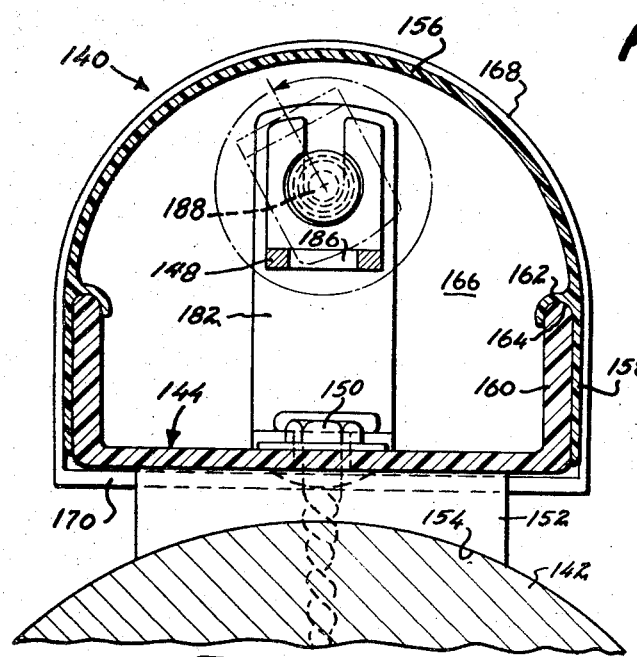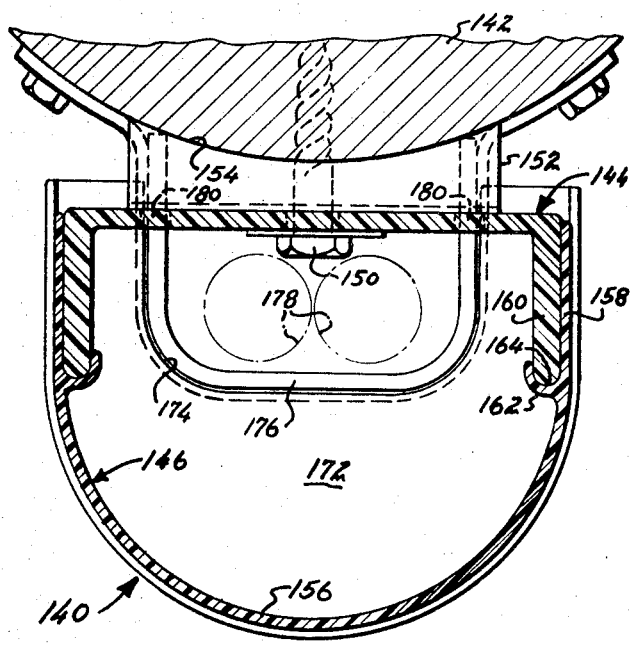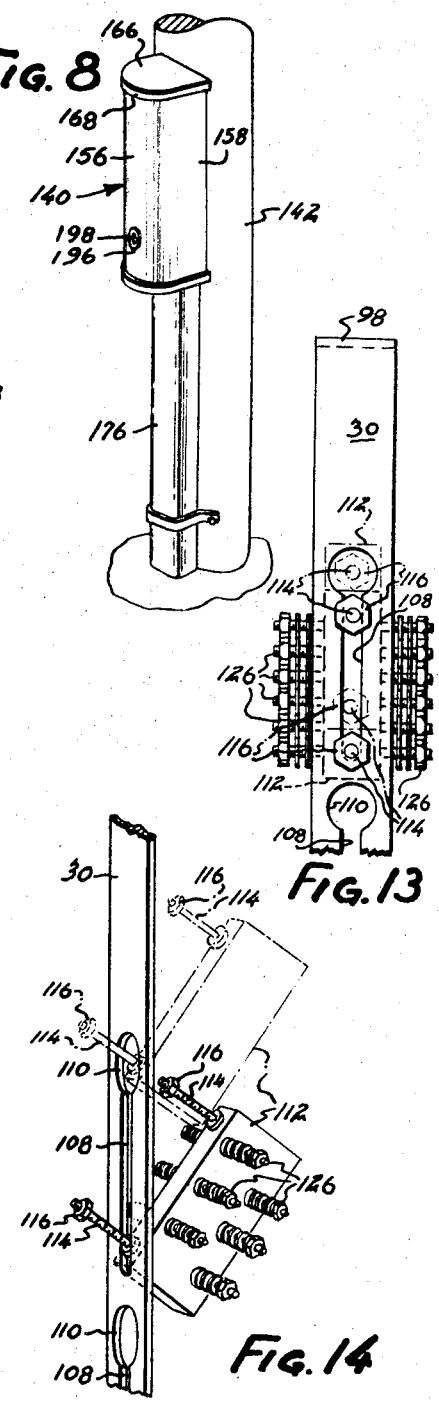

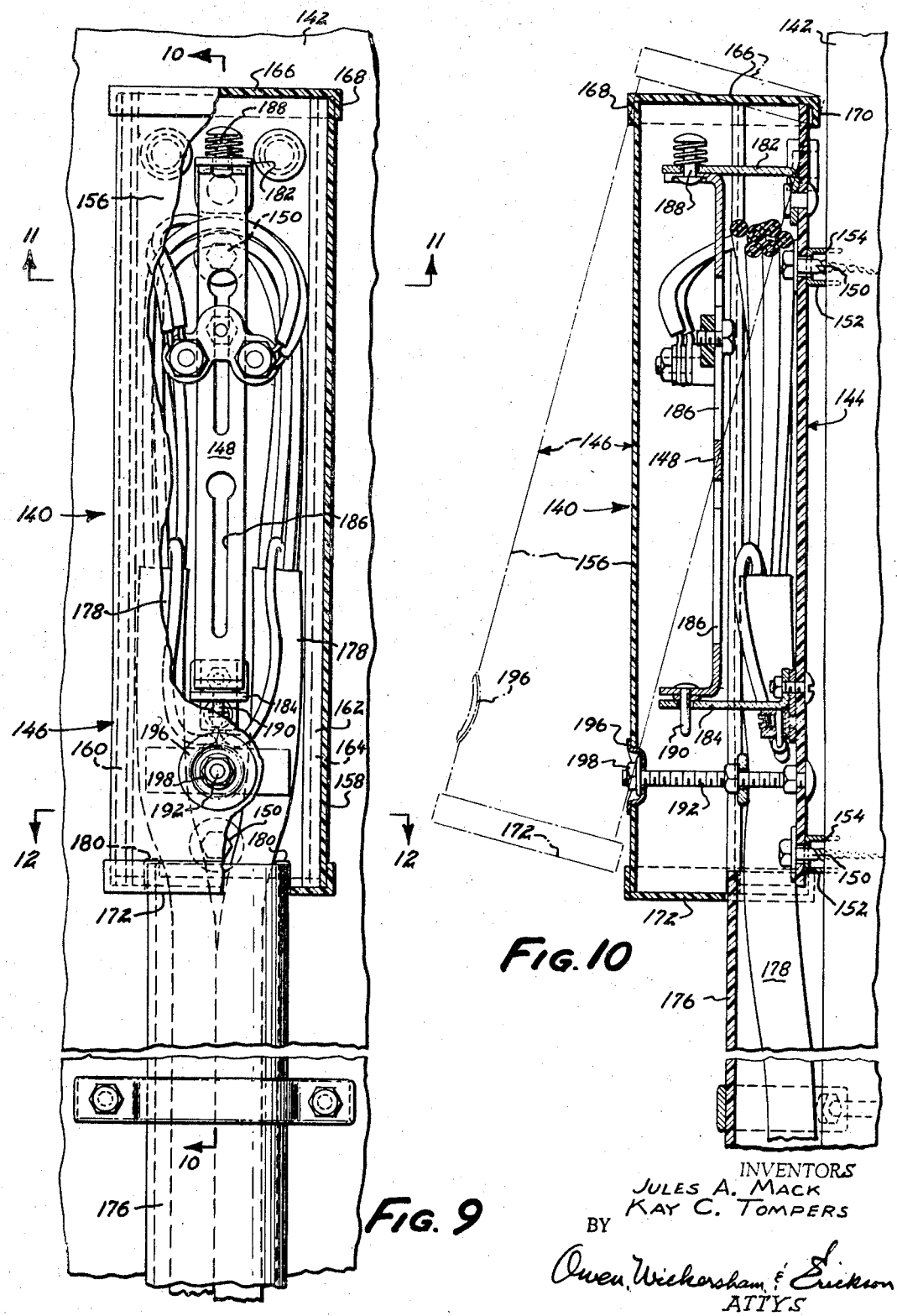

United States Patent Office 3,404,212
Patented Oct. 1, 1968

3,404,212
TERMINAL DEVICE FOR WIRE OR
CABLE FACILITIES
Jules A. Mack, Conover, N.C., and Kay C. Tompers, Dallas, Tex., assignors to Superior Continental Corporation, a corporation of Delaware
Filed Jan. 13, 1965, Ser. No. 425,264
11 Claims. (Cl. 174—38)

ABSTRACT OF THE DISCLOSURE

A terminal device for housing and providing access to the interconnections of electrical components of wiring systems. A mounting bracket is pivotally and swingably mounted on spaced support members in the housing to permit easy access to the interconnections mounted thereon. The bracket is provided with key hole slots to provide better mounting means for connector blocks without requiring removal of the mounting elements secured to the blocks. The housing parts are further made of glass fibres bonded together by a plastic which can be assembled and secured without the use of tools. A single, simple locking device is manipulated by a special wrench to make the housing temper proof.

---

This invention relates to a terminal device for housing, supporting and thereby providing access to the splices or interconnections of electrical conductors and auxiliary components in wiring or cable systems.

In the installation of wire and cable facilities, both aerial and buried, such as telephone communication systems it is essential to provide access to the main wire or cable run at certain preselected locations. Such access is necessary, for example, to permit the splicing of wire and cable ends, to facilitate the installation or attachment of branch lines to the main line such as the various wires for individual customer service lines in a telephone system; to provide a means for installation of electrical protectors to guard against wire and cable damage due to lightning effects; to permit installation of loading coils for the inductive loading of wire and cable circuits for transmission improvement; and to facilitate testing and maintenance procedures. With access devices heretofore available, which are commonly referred to as terminals, the problem arose of providing a terminal device that combined the characteristics of structural strength and durability so as to withstand all weather conditions; of ease of operation in opening and closing; of being substantially free of small cracks or openings when closed to prevent insects or small animals from getting inside; of being tamperproof so that it would be difficult for unauthorized persons to open it; of having adequate flexibility and internal capacity for accommodating a wide variety of electrical connection devices while maintaining a suitable external configuration having a minimum size; and of having an attractive appearance that would blend easily with the surrounding landscape.

A general object of the present invention is to provide an improved and highliy versatile terminal device that overcomes all of the aforesaid problems and, in addition, has other important advantages and features.

A more specific object of the present invention is to provide a terminal device having an internal mounting bracket for supporting connector blocks or other auxiliary components which is movable to different positions within the terminal. The conduit in a conventional wire or cable may be comprised of a large number of conductors, and this coupled with the limited space normally available heretofore, made the actual handling and connection of conductors to the connector blocks an extremely tedious and time consuming process. Our invention, which enables the connector blocks to pivot or swivel within the terminal, solves this problem and thereby decreases the total labor required for the installation and maintenance of wiring systems. Moreover, it makes posible a greater degree of accuracy in interconnecting a multiplicity of wires since the wires being worked on can be made more visible and easily accessible. Another advantage of our improved terminal device is that the movable mounting bracket normally extends toward the front of the terminal so that the connector blocks mounted thereon are well clear of the wires of the conduit which are located at the terminal back and cannot interfere with, snag or damage them.

Another object of the present invention is to provide a terminal device having an internal mounting bracket to which connector blocks and other such components can be attached without first removing and then replacing nuts from studs or attaching screws on the blocks. A particular feature of our movable mounting bracket is that it can readily accommodate various connector blocks and other components in different positions, that is, facing to the front or to the back of the terminal proper, as may be desired.

A further object of the present invention is to provide a terminal device having an internal support or mounting bracket for block type connectors and the like that is completely removable without unthreading nuts and bolts when it is desired to accommodate components other than mere wires or connector blocks in the terminal.

Still another object of our invention is to provide a terminal device that is particularly easy to assembly and mount either in the ground or above it on a pole in the field. A unique arrangement of components provides an enclosure having a cover which is secured in place by a single bolt and a nut that is arranged on the cover so as to be substantially tamperproof. Since it has relatively few components, our terminal device can be installed easily by one man in an unusually short period of time.

Another object of the present invention is to provide a terminal device for wire or cable facilities which has an unusually attractive appearance, and yet is particularly well adapted for ease and economy of manufacture.

Yet another object of the present invention is to provide a terminal device wherein the conductors are secured in a manner that substantially eliminates the possibility of damage due to any movement of an installed device such as by frost heaving or pushing by animals. This problem was overcome in our terminal by the utilization of a single unique support member at the terminal top for retaining the conductors, as well as the mounting bracket for the connector blocks, and by thereby eliminating one support member heretofore required in previous terminal devices. Another feature of our one support arrangement is that it provides a maximum of slack for the conductor and thus facilitates and simplifies the connection of connector blocks and the like.

Other objects, advantages and features of our invention will become apparent from the following detailed description of various embodiments thereof taken in conjunction with the accompanying drawings, in which:

FIG. 1 is a view in perspective of a terminal device embodying the principles of the invention and installed in the ground;

FIG. 2 is an enlarged front elevation view of the terminal device shown in FIG. 1 with a portion of the cover broken away to show internal details;

FIG. 3 is a view in side elevation and in section taken along line 3—3 of FIG. 2 and showing front cover portions in phantom and in the dismantled position;

FIG. 4 is an enlarged fragmentary view in elevation and in section taken along line 4—4 of FIG. 2 showing the mounting bracket in the removed position with a central portion broken away to conserve space;

FIG. 5 is a view in section taken along the line 5—5 of FIG. 3;

FIG. 6 is an enlarged detail view of the upper end of the support bracket for the removable mounting bracket;

FIG. 7 is a view in section taken along line 7—7 of FIG. 6;

FIG. 8 is a view in perspective of a somewhat modified form of the invention adapted for mounting above the ground level;

FIG. 9 is a view in front elevation of the terminal device shown in FIG. 8 with a portion of the front cover broken away to show internal details;

FIG. 10 is a view in side elevation and in section taken along line 10—10 of FIG. 9 with the cover of the device partially removed and shown in phantom;

FIG. 11 is an enlarged view in section taken along the line 11—11 of FIG. 9;

FIG. 12 is an enlarged view in section taken along the line 12—12 of FIG. 9;

FIG. 13 is an enlarged fragmentary view of a mounting bracket according to the invention;

FIG. 14 is an enlarged fragmentary view in perspective of a mounting bracket embodying the principles of the invention with a connector block shown as it is being inserted.

With reference to the drawings, FIG. 1 shows a terminal device 20 embodying the principles of the invention and particularly adapted for use with an underground wiring system. In general, the terminal 20 comprises a main body member 22, a removable front cover member 24 attached to and extending downwardly from the upper end of the body member, and a removable ground line cover member 26 at its lower end. The terminal is supported in the ground by means of a stake member 28 of conventional design attached to the rear side of the main body member. However, it may also be installed on a pole or post when desired, as will be explained later. Within the terminal 20 is a movable mounting bracket 30 (FIG. 4) adapted to support one or more terminal blocks, loading coils or the like for subsequent connection with conductors of the wire or cable pairs entering the terminal. This feature of the invention will be described in detail later on in the specification.

The aforesaid main components forming the terminal enclosure, namely, the main body member 22, the front cover 24, the ground line cover 26 and also the stake member 28, are all preferably made of a reinforced plastic material such as Fiberglas reinforced polyester, or any other suitable plastic material. Such plastic materials have the advantage of being electrically nonconductive, as well as noncorrosive and almost totally weather resistant, and they may be formed by conventional molding processes to provide the aforesaid components having the desired shape and rigidity. Also, the plastic material used for forming the aforesaid components may be precolored, as before molding, so that the finished product will have the desired color without having to be painted.

When mounted in the ground, the terminal device 20 is generally located directly above the cable line for which it is to be used. The ground line cover member 26 extends into the ground for about half its length (e.g., six inches) and the cable line to be serviced is brought underneath its lower edge and up into the inside of the terminal device where it can be readily accessible for splicing or connecting to terminal blocks or other auxiliary lines. As shown in FIGS. 2, 3 and 5, the main body member 22 or back plate, as it may be called, has generally a channel shaped cross section from its top to its bottom end, including a web portion 32 forming its back side and forwardly extending parallel flanges 34. Extending longitudinally down the back side 32 may be provided a slightly bulged out portion 36 which serves to give the main body additional bending strength and rigidity. It also provides a cooperating exterior portion to facilitate the attachment of the terminal to the ground stake 28 (see FIG. 5).

Spaced from the lower end of the terminal device 20 and mounted in the flanges 34 are a pair of mounting bolts or studs 38 for supporting the ground line cover member 26. Fixed to the inside ends of these studs is a washer 40 which is spaced from the inside surface of the flange 34 in which each stud is mounted. The ground line cover 26 also has a channel shaped cross section with a pair of flanges 42 that fit inside the flanges 34 and also inside the stud washers 40 on the main body member. As shown in FIG. 3, a pair of slots 44 are formed in the flanges 42 which extend upwardly from their edges at the same angle (e.g., 45°). Thus, when the ground line cover is easily attached to the main body member by sliding the slots 44 over the stud members 38, it fits snugly between the flanges 32.

The front cover 24 is also essentially channel shaped in cross section, having a front web portion 46 and integral side flange members 48. As shown in cross section in FIG. 5, the inside of the front cover 24 is shaped so that a shoulder 50 is formed on the inside of each flange which extends substantially along its full length. When the front cover 24 is properly attached to the main body member 22, the shoulders 50 abut against the edges of the side flanges 34, with the front cover flange members 48 overlapping them. The front cover member has an integral upper end portion 52 that curves around and connects with the upper ends of the flange members 48. Extending downwardly from the end portion 52 and between the flange members 48 at their upper ends is a retaining flange 54. The latter is adapted to fit over the upper edge 56 of the web portion 32 on the main body member 22. Thus, when the front cover is assembled on the main body member, as shown in FIG. 3, the upper end of the cover member 24 is retained by the upper end of the main body member 22 while its lower end extends outwardly from the main body member. The front cover can then be swung inwardly until its side flanges 48 overlap the side flanges 34 of the main body member and the shoulders 50 thereof abut with the edges of the latter side flanges. A pair of inwardly extending stud members 58 are provided in the opposite flanges 48 of the front cover 24 and are located so as to fit into a pair of slots 60 formed in the side flanges 34 of the main body portion 22. Each stud member 58 preferably is provided with a washer 62 fixed near its inner end, thereby leaving a space between it and the flange 48 that is slightly larger than the thickness of the main body flanges 34. The front cover, of course, is installed after the ground line cover 26 has been installed, as previously described, and when the front cover has been moved properly into place with the studs 58 in the slots 60, it overlaps the ground line cover at its lower end and prevents the removal thereof.

Supporting the pivotal mounting bracket 30 within the terminal device 20 are a pair of fixed support brackets 64 and 66, one being located near the upper end of the main body member and the other being spaced downwardly from it a predetermined distance. These mounting brackets are secured to the web portion 32 of a main body member 22 by separate bolts 68 and 70 which extend through from the rear side of the main body portion. The lower support bracket 66 has generally an inverted U-shape, and fixed to an inner flange 72 thereof by the bolt 70 is a fitting 74 having a standard type connecting post 76 for securing a ground wire. On an outer flange 78 of the lower bracket member 66 is a fixed locking bolt 80 to which the outer cover member 24 is attached when the terminal device 20 is closed, and spaced inwardly from the outer flange member 78 is a hole 82. The upper support bracket member 64 is generally L-shaped with an inner leg portion 84 bolted to the web portion 32 of the main body member 22 and an outwardly extending leg portion 86. Near the outer end of the latter leg portion 86 is a retractable retaining pin 88 whose axis is aligned vertically with the hole 82 in the lower support bracket 66. As shown in FIG. 6, the retaining pin is movably situated in a hole 90 and is attached at its upper end to an enlarged head 92 which itself is fixed to the end of a coil spring 94 retained between the head 92 and the upper side of the support bracket 64. The lower end of the pin 88 also has a head portion 96 that is larger than the hole 82. The coil spring, therefore, constantly urges the pin 88 upwardly.

The movable mounting bracket 30 is a relatively narrow and rectangular shaped member with right angle legs 98 and 100 at its upper and lower ends. As shown in detail in FIGS. 6 and 7, the leg 98 at the upper end of the mounting bracket is bifurcated by a slot 102 which is slightly wider than the movable pin 88 so that the pin can easily slide therein. Around the inner end of the slot 102 is a countersunk recess 104 having a diameter somewhat greater than the lower head end 96 of the retaining pin. Fixed to the leg 100 at the lower end of the mounting bracket 30 and generally perpendicular thereto is a stationary pin member 106 having a diameter slightly smaller than the hole 82 near the outer end of the lower support bracket 66. When this fixed pin 106 at the lower end of the mounting bracket 30 is within the hole 82, as shown in FIG. 4, then the slotted leg 98 at the upper end of the mounting bracket can be moved around the spring loaded retaining pin 88 when the upper end of the pin 88 is pressed downwardly against the spring 94. When the spring is released, the lower head end 96 of the retaining pin presses upwardly and is seated in the recess 104 to secure the mounting bracket in its installed position. Yet, when thus installed, the bracket 30 is rotatable about the aligned axes of the fixed lower pin 106 and the spring movable retaining pin 88. The mounting of pin 106 in hole 82 and the head 36 in recess 104 provides a means for pivotally mounting the bracket 30 between support brackets 64 and 66, and when the head 96 is released from the recess 104 the pin 106 in hole 82 provides a means for swingably mounting the bracket 30 on bracket 66 as illustrated in FIG. 4.

As shown in FIG. 2, the mounting bracket 30 is provided with key hole shaped slots 108 having an enlarged portion 110 at one end. Several such slots are spaced apart along its length to facilitate the connection of terminal block connector members 112. The purpose of the key hole shaped slots 108 is to enable such conventional type connector members having studs 114 extending therefrom with nuts 116 threaded to the studs to be attached to the mounting bracket without having to first remove the nuts from the studs thereon. As shown in FIG. 14, one stud with a nut attached is inserted through the enlarged part 110 of a slot, and after the connector block 112 is rotated, its other stud member is similarly inserted. The studs are now both moved into the narrow part of the slot and the nuts 116 thereon are tightened.

The installation of the terminal 20 may be accomplished easily, as shown in FIG. 1, by first placing the stake 28 in the ground just slightly to the rear of the conductors to be housed within the terminal. The main body member 22 is then secured to the stake 28 by means of suitable mounting bolts 29 that extend through the back portion 32 of the terminal 20. When mounting the terminal in the ground, the stake member 28 is preferably provided with a pair of key hole slots (not shown). The nuts 31 on the mounting bolts 29 are then merely loosened and pushed back so that the heads of the bolts 29 are engaged in the stake key hole slots. The bolts are then tightened to secure the terminal and generally it is positioned when secured with its lower end approximately six inches below the ground level.

Whether the terminal 20 is installed above or below the ground, the main conduit 118 of the wiring system entering the terminal (which usually comprises a bundle of small wires) is directed upwardly beneath one side of a retaining clamp 120 that is mounted at its center on a bolt 122 extending through the main body member. The conduit is thus retained on the back of the terminal and is most conveniently formed in a loop which extends just below the upper support bracket 64 and downwardly beneath the retaining clamp 120. A nut 124 on the retaining clamp bolt 122 is now tightened to hold the conduit 118 in place. The ground line cover 26 can now be attached to the main body by merely directing its angular slots 44 over the stud members 38 until it is seated in place. Individual wires from the conduit can now be pulled from the conduit bundle for attachment to terminal post 126 on connector blocks, load coils or the like. The mounting bracket 30 is conveniently swiveled to either side, thereby making the connector block terminal post 126 readily accessible and greatly simplifing the connection of wires. When connection to one side of the connector black terminal posts 126 are complete, the mounting bracket 30 may be swiveled or turned to provide access to the connector block terminal posts 126 on the opposite side, or to connect wires from the opposite side of the conduit bundle. Also, a ground wire 128 can be attached to the ground connector post 76 near the lower support bracket 66.

When all of the conductors have been connected, and with the ground line cover attached, as previously described, the front cover 24 is now attached. Its upper end is overlapped over the upper end of the main body member 22, and the lower end is swung toward the main body member so that the studs 58 seat in the slots 60. Simultaneously, the threaded end of the locking bolt 80 extends through an opening in the front cover 24. Seated within the latter opening is a recessed washer 130, and the bolt 80 extends into the recess only far enough to permit a locking nut 132 to be well threaded to it. When the locking nut is attached to the bolt and tightened, it is well within the recessed washer and can only be loosened with a specially made wrench, thereby making the terminal 20 relatively tamperproof. With the nut 132 tightened, the terminal 20 is secured and the conduit connections are completely enclosed in a weatherproof space.

Another embodiment of the present invention is shown by the terminal 140 which is adapted for mounting above the ground on a telephone pole 142 or the like. In its major structural features the terminal 140, though smaller, is generally similar to the terminal 20 and comprises a main body member 144, a removable front cover member 146 and a pivotal and removable internal mounting bracket 148. The main body member 144, as shown in FIGS. 11 and 12, is channel shaped in cross section. It is preferably secured in its desired location by means of a pair of vertically spaced apart lag screws 150 which extend from the inside of the main body member and through it into the pole 142. Each screw 150 also passes through a spacer 152 having a curved side 154 to conform to the curvature of the pole, thereby enabling the terminal to be mounted firmly. The front cover 146 is generally U-shaped in cross section with a curved front portion 156 and integral side flanges 158 that overlap the flanges 160 of the main body member 144. Extending longitudinally along the opposite inner sides of the front cover are a pair of integral lip members 162 that form groove-like shoulders 164 adapted to engage the edges of the main body side flanges 160 when the front cover 146 is properly in place on the main body member 144. At its upper end the front cover is formed with a transverse end member 166 with a peripheral edge flange 168 that overlaps downwardly over both the curved front portion and the side flanges. A straight portion 170 of the edge flange which extends between the side flanges 158 serves to hold the upper end of the front cover in position on the main body member in the same manner as the front cover 24 of the terminal 20, as described previously. At its lower end the front cover has a U-shaped transverse end portion 172 formed by a cutout portion 174. When the front cover is properly in its closed position, its lower end portion 172 fits around a channel shaped riser guard 176 which, like the front cover 146 and main body 144, is preferably made from a reinforced plastic material. The riser guard 176 fits over the conduit 178 or wire bundle of the cable or wire facilities which may extend from underground at the foot of a pole 142. At its upper end the flanges of the riser guard fits into slots 180 formed in the lower end of the main body member. Thus, when the front cover 146 is closed, the conduit 178 is completely enclosed from its underground location into the terminal 140.

Within the terminal 140 the conduit 178 may be connected to the movable mounting bracket 148 in much the same manner as with the previous embodiment. The mounting bracket is supported on upper and lower support brackets 182 and 184, and although it may be smaller in size, it preferably has all of the features of the invention, including a plurality of key hole shaped openings 186 for receiving connector blocks. A spring loading retaining pin 188 secures the mounting bracket 148 at its upper end and it pivots about a fixed pin 190 at its lower end. A locking bolt 192 extends outwardly from the main body member 144, and its threaded end projects through an opening 194 within a recessed washer 196 seated in an opening near the lower end of the front cover 146. When properly in place, the front cover is secured by a nut 198 that lies within the washer 196 when threaded to the locking bolt 192.

The terminal 20 may also be secured, if desired, to a pole or post instead of stake, substantially in the same manner as shown with respect to the terminal 140. Here, lag screws, such as shown at 150 would be utilized instead of the bolts 29, and a similar spacer or bracket would also be retained by the lag screws between the terminal and the post.

With either of the terminals 20 or 140, it should be apparent that a remarkable ease and simplicity of installation and accessibility are afforded by the unique combination of elements. The present invention provides a terminal that is not only adaptable to a wide variety of wire and cable facilities, wether above or below ground, but also a terminal wherein service to wiring such as splicing and interconnection to conductors can be performed with remarkable speed, convenience and efficiency.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A terminal device for housing and supporting the interconnection of conductors in an underground or an above ground wiring system, comprising:
    a main body member and a front cover member cooperating to form an enclosed housing having an opening at its lower end to receive a main conduit of the wiring system;
    means on said main body member for connecting said housing to a member secured to the ground;
    a pair of rigid support members fixed to and spaced apart on said main body member and within said housing;
    an elongated mounting bracket for supporting auxiliary components that are adapted for connection with at least some of the conductors in the wiring system;
    and means pivotally connecting said mounting bracket to said support members, said latter means including a fixed pin connecting said mounting bracket to a support member at one end and a movable pin connecting said mounting bracket to the other support member.

2. A terminal device for housing and supporting the interconnection of conductors in an underground or an above ground wiring system, comprising:
    a main body member and a front cover member cooperating to form an enclosed housing having an opening at its lower end to receive a main conduit of the wiring system;
    means on said main body member for connecting said housing to a member secured to the ground;
    a pair of rigid support members fixed to an spaced apart on said main body member and within said housing;
    an elongated mounting bracket for supporting auxiliary components that are adapted for connection with at least some of the conductors in the wiring system;
    and means pivotally connecting said mounting bracket to said support members,
    said latter means including a fixed pin attached to one end portion of said mounting bracket and a hole in one said support member for receiving said fixed pin, a slot in the opposite end portion of said mounting bracket, and a movable retaining pin mounted in the other said support member, and spring means for urging said retaining pin away from the other support member and against said opposite end portion when seated in the slot thereof.

3. A terminal device for housing and supporting the interconnection of conductors in an underground or an above ground wiring system, comprising:
    a main body member and a front cover member cooperating to form an enclosed housing having an opening at its lower end to receive a main conduit of the wiring system;
    means on said main body member for connecting said housing to a member secured to the ground;
    a pair of rigid support members fixed to and spaced apart on said main body member and within said housing;
    an elongated mounting bracket for supporting auxiliary components that are adapted for connection with at least some of the conductors in the wiring system;
    and means pivotally connecting said mounting bracket to said support members,
    said main body member and said cover member both being generally channel shaped in cross section, said cover member having an integral wall portion between the top of its side flanges at its upper end, and a retaining flange extending between the edges of said side flanges, the side flanges of said cover member overlapping the side flanges of said main body member,
    a single bolt secured at its head end to said main body member with its threaded end projecting forwardly and a recessed washer member seated in an opening in said front cover member, said threaded end of said bolt extending through said washer, and a nut threaded to said bolt with said recessed washer when said cover member is secured in place.

4. A terminal device for housing and supporting the interconnections of a wiring system comprising a housing, having an open channel body, spaced support means secured within the channel, a bracket for supporting the interconnections, and means swingably mounting the bracket on one of said support means,
    and means pivotally mounting the bracket between the support means,
    said support means comprising a pair of brackets and the pivotal swingable means comprising a pair of aligned openings in the pair of brackets, a pivot pin reciprocably mounted in one of the openings, a pivot pin secured to one end of the first mentioned bracket and extending thru the other of said openings, and means for securing the other end of the first mentioned bracket for pivotal mounting on the reciprocably mounted pin.

5. A device as defined in claim 4 wherein said securing means includes means for releasing the said other end of the first mentioned bracket from the pivotal mounting, the other of said openings being larger than the pivot pin therein by an amount to permit the pin to make an angle therewith sufficient to permit the other end of said first mentioned bracket to swing away from the reciprocably mounted pin.

6. A terminal device for housing and supporting the interconnection of conductors in an underground wiring system, comprising:
   a main body member having a channel shaped cross section with forwardly extending side flanges;
   means on said main body member for connecting said main body member to an upright stake member buried at one end in the ground;
   a front cover member having a generally channel shaped cross section with rearwardly extending side walls spaced apart a distance greater than the distance between the outer surfaces of said side flanges, and an integral end portion between said side walls at their upper ends;
   a pair of stud members fixed in each of said side flanges of said main body near the lower ends thereof;
   a ground line cover member having a channel shaped cross section including a pair of spaced apart side walls each having a slot extending upwardly and inwardly at an angle from its outer edge, said slots having a width slightly greater than the diameter of said studs, said front cover being connected to said main body at its upper end and overlapping said ground line cover at its lower end;
   a pair of rigid support members fixed to and spaced apart on said main body member between the side flanges;
   an elongated mounting bracket for supporting auxiliary components that are adapted for connection with at least some of the conductors in the wiring system;
   and means pivotally connecting said mounting bracket to said support members.

7. The terminal device as described in claim 6 wherein said main body member, said front cover member and said ground line cover member are all molded from reinforced glass fibers and polyester bonding material having a coloring agent added prior to the molding process.

8. The terminal device as described in claim 6 including a retaining flange extending between the side walls of said front cover member at its upper end for overlapping the upper end of said main body member; a bolt retained at its head end on said main body member and having a forwardly projecting threaded end which extends through an opening in said front cover; and a nut threaded to said bolt for securing said front cover to said main body member.

9. A terminal device for housing and supporting the interconnection of conductors in an underground wiring system, comprising:
   a main body member;
   a front cover member removably attached to said main body member and forming therewith a housing;
   stud means fixed in each of said side flanges of said main body near the lower ends thereof;
   a ground line cover member having a channel shaped cross section including a pair of spaced apart side walls each having a slot extending upwardly and inwardly at an angle from its outer edge, said slots having a width slightly greater than the diameter of said studs, said front cover being connected to said main body at its upper end and overlapping said ground line cover at its lower end;
   a pair of rigid support members fixed to and spaced apart on said main body member between the side flanges;
   an elongated mounting bracket for supporting auxiliary components that are adapted for connection with at least some of the conductors in the wiring system;
   means pivotally connecting said mounting bracket to said support members;
   and means extending through said main body member and into a fixed member secured to the ground, whereby said terminal device is elevated completely above the ground level.

10. The terminal device as described in claim 9 wherein said latter means comprises a plurality of screw members, and spacer means between said main body member and said fixed member each having a hole through which a said screw member can pass.

11. A terminal device for housing and supporting the interconnection of conductors in an underground or an above ground wiring system, comprising:
   a main body member and a front cover member cooperating to form an enclosed housing having an opening at its lower end to receive a main conduit of the wiring system;
   means connecting said main body member to an upright member buried at one end in the ground;
   a pair of rigid support members fixed to and spaced apart on said main body member and within said housing;
   an elongated mounting bracket for supporting auxiliary components that are adapted for connection with at least some of the conductors in the wiring system;
   means pivotally connecting said mounting bracket to said support members;
   and a channel shaped riser guard extending upward within said lower end opening of said front cover.

References Cited

UNITED STATES PATENTS

| | | | |
|---|---|---|---|
| 2,304,923 | 12/1942 | Jackson | 317—120 |
| 2,968,689 | 1/1961 | Johnson | 174—60 X |
| 3,188,379 | 6/1965 | Simon | 174—38 |
| 3,235,771 | 2/1966 | Schwartz | 174—60 X |
| 979,011 | 12/1910 | Levy | 317—120 X |
| 1,079,445 | 11/1913 | Smith | 248—68 X |
| 1,651,969 | 12/1927 | Saxton | 248—290 |
| 3,162,718 | 12/1964 | Gunthel | 174—38 |
| 3,164,668 | 1/1965 | Skubal | 174—37 |
| 3,180,920 | 4/1965 | Fletcher et al. | 174—38 |
| 3,185,757 | 5/1965 | Phillips | 174—38 |
| 3,309,456 | 3/1967 | Connell | 174—60 |

FOREIGN PATENTS

| | | |
|---|---|---|
| 1,100,982 | 4/1955 | France. |

LARAMIE E. ASKIN, *Primary Examiner.*